US009318000B1

(12) United States Patent
Allen et al.

(10) Patent No.: US 9,318,000 B1
(45) Date of Patent: Apr. 19, 2016

(54) PRESERVING ACCOUNT SECURITY BETWEEN CASINO AND ONLINE ACCESS

(75) Inventors: Jeffrey L. Allen, Naperville, IL (US); Peter R. Anderson, Glenview, IL (US); Mark B. Gagner, West Chicago, IL (US); John R. Werneke, Naperville, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 446 days.

(21) Appl. No.: 13/115,830

(22) Filed: May 25, 2011

Related U.S. Application Data

(60) Provisional application No. 61/348,037, filed on May 25, 2010.

(51) Int. Cl.
*G06F 17/00* (2006.01)
*G07F 17/32* (2006.01)

(52) U.S. Cl.
CPC ............ *G07F 17/3255* (2013.01); *G07F 17/32* (2013.01)

(58) Field of Classification Search
CPC . G07F 17/32; G07F 17/3237; G07F 17/3239; G07F 17/3255
USPC ................................................ 463/25, 29, 42
See application file for complete search history.

(56) References Cited

U.S. PATENT DOCUMENTS

| | | | | |
|---|---|---|---|---|
| 7,303,475 | B2 * | 12/2007 | Britt et al. | 463/42 |
| 7,909,693 | B2 | 3/2011 | Kammler et al. | |
| 7,996,367 | B2 * | 8/2011 | Foygel et al. | 707/668 |
| 2005/0170883 | A1 * | 8/2005 | Muskin | 463/25 |
| 2008/0300051 | A1 | 12/2008 | Walker et al. | |
| 2009/0029766 | A1 * | 1/2009 | Lutnick et al. | 463/29 |
| 2009/0075727 | A1 * | 3/2009 | Walker et al. | 463/25 |
| 2009/0176580 | A1 * | 7/2009 | Herrmann et al. | 463/43 |
| 2009/0239650 | A1 * | 9/2009 | Alderucci et al. | 463/25 |
| 2009/0291755 | A1 * | 11/2009 | Walker et al. | 463/29 |
| 2010/0099485 | A1 | 4/2010 | Sommer et al. | |
| 2010/0248843 | A1 | 9/2010 | Karsten | |
| 2011/0111842 | A1 | 5/2011 | Walker et al. | |
| 2011/0159966 | A1 * | 6/2011 | Gura et al. | 463/42 |
| 2011/0183749 | A1 * | 7/2011 | Allen et al. | 463/25 |
| 2011/0218044 | A1 * | 9/2011 | Joshi et al. | 463/37 |
| 2011/0275438 | A9 * | 11/2011 | Hardy et al. | 463/42 |

* cited by examiner

*Primary Examiner* — Michael Cuff
(74) *Attorney, Agent, or Firm* — DeLizio Law, PLLC

(57) ABSTRACT

A method includes receiving, by a wagering game player, a request to access an online account for the wagering game player at a website. The method includes creating the online account for the wagering game player, in response to a determination that the online account is not created, wherein the online account comprises an online player identity. The method includes performing operations, after determination that the online account has not claimed a casino account for the wagering game player. Operations include creating the casino account for the wagering game player through the online account at the website, in response to a determination that the casino account is not created, wherein the casino account comprises a casino player identity. The operations include claiming the casino account for the online account of the wagering game player, wherein the casino account is inaccessible at the wagering game machine using the online player identity.

20 Claims, 7 Drawing Sheets

PRESERVING ACCOUNT SECURITY BETWEEN CASINO AND ONLINE ACCESS

RELATED APPLICATIONS

This application claims the priority benefit of U.S. Provisional Application Ser. No. 61/348,037 filed May 25, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game systems including preserving account security between casino and online access.

BACKGROUND

Wagering game machines (WGMs), such as slot machines, video poker machines and the like, have been a cornerstone of the gaming industry for several years. Generally, the popularity of such WGMs depends on the likelihood (or perceived likelihood) of winning money at the WGM and the intrinsic entertainment value of the WGM relative to other available gaming options. Where the available gaming options include a number of competing WGMs and the expectation of winning at each WGM is roughly the same (or believed to be the same), players are likely to be attracted to the most entertaining and exciting machines. Shrewd operators consequently strive to employ the most entertaining and exciting WGMs, features, and enhancements available because such machines attract frequent play and hence increase profitability to the operator.

Wagering game establishments can extend wagering game experiences to the Internet to reinforce player loyalty. The online experience can be personalized for each player such that websites can allow the players to view their wagering statistics (e.g., win/loss percentages, amounts wagered over time, etc.), progress in multi-level games, loyalty club account information, etc. Player demographic information can be collected by online profiles so that wagering behavior can be correlated to the demographic information and better targeted advertising can be created. Wagering promotions and casino events can be announced on the website and players can register for the events online. In the online experience, players can engage in practice wagering sessions alone or with other players, participate in discussion boards and other social networking activities (e.g., viewing published statistic information of other players, scheduling outings to wagering game establishment with friends, etc.).

BRIEF DESCRIPTION OF THE FIGURES

Embodiments of the invention are illustrated in the Figures of the accompanying drawings in which.

DESCRIPTION OF THE EMBODIMENTS

Figure 1:
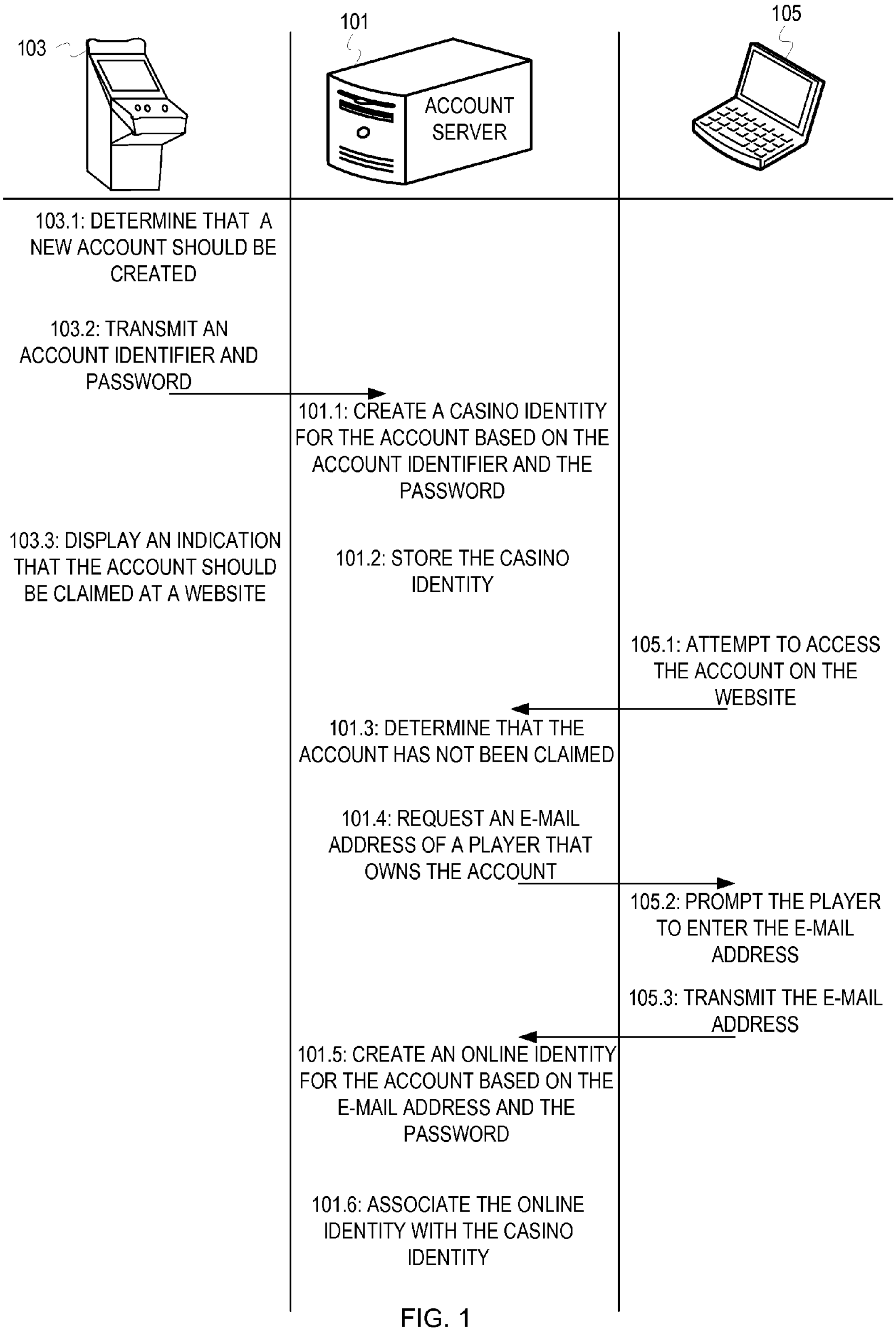
FIG. 1 is a conceptual diagram of preserving account security between casinos and the Internet, according to some example embodiments.

This description of the embodiments is divided into five sections. The first section provides an introduction to some example embodiments, while the second section describes example wagering game machine architectures. The third section describes example operations performed by some embodiments and the fourth section describes example wagering game machines in more detail. The fifth section presents some general comments.

INTRODUCTION

This section provides an introduction to some example embodiments of the invention.

To enable personalization of online player experiences, players can create accounts that can be used in both wagering game establishments and online. Account information typically contains private personal information of the player. However, protecting the private personal information (e.g., e-mail address, physical address, date of birth, etc.) of players in wagering game establishments can be challenging due to wagering game establishment environments. Wagering game establishments are high traffic environments where account information can be compromised when someone looks over a player's shoulder while the player is entering the information. In addition, wagering game establishments use an array of overhead cameras that capture every transaction on the wagering floor. So, players may be unwilling to provide private personal information when creating accounts in wagering game establishments.

Wagering game establishments can use two accounts for a same player to preserve security of a player's private personal information. The two accounts can comprise a casino account and an online account. Each account having a different identity for the player—a casino player identity for a casino account and an online player identity for an online account. In some example embodiments, the casino account can be at least one of a persistent state game account and an account-based wagering account.

When a player creates a casino account in a wagering game establishment, a casino player identity is created based on a username and a security credential indicated by the player. Examples of a security credential include a password, a biometric credential (e.g., fingerprint, facial recognition, etc.), a key fob or a combination thereof. Also, during creation and accessing of the casino account at the wagering game machine, no private information is collected.

The casino player identity allows the user to log into the casino account on wagering games machines so that account information (e.g., game progress, wagering statistics, electronic rewards, etc.) can be collected and stored. After the casino account is created, the player can be notified that the account should be "claimed" online so that the player can access the account information through an online account. The notification can be through a message at the wagering game machine, a message transmitted to a mobile device of the wagering game player, etc. The wagering game player can create an online account using an online player identity.

When the casino account is claimed by the online account, the player provides an online player identity that is separate from the casino player identity. For example, the online player identity can be an e-mail address, different username, etc. An online account is created for the account based on the online player identity. In some example embodiments, the security credential is the same for both the casino player identity and the online player identity.

The online player identity allows the user to log into the online account. If the player's casino player identity is compromised by a third-party, the third-party likely would not be aware of the player's online player identity. Therefore, the third party would not be able to log into the player's account online to view private information of the player. Even if the third-party claimed the casino account before the player, the third party would not see the player's private information because the player did not provide any private information when the account was created in the casino.

Moreover, in some example embodiments, one or more additional accounts can be associated with the casino account and the online account. In particular, the casino account and the online account can be controlled by a manufacturer of the wagering game machine (i.e., manufacturer-controlled accounts). Accordingly, an additional account can include a player account controlled by the casino. For example, the additional account for a player can be accessible through a wagering game machine (e.g., a player tracking account) and/or through an online access for the website for the casino. Therefore, either or both of these casino-controlled accounts can use a same security credential with a different player identity. Alternatively or in addition, at least some of the data can be exchanged among the casino-controlled accounts and the manufacturer-controlled accounts.

FIG. 1 is a conceptual diagram of preserving account security between casinos and the Internet, according to some example embodiments. An account server 101, a WGM 103, and a computer 105 are communicatively coupled through a network. At stage 103.1, the WGM 103 determines that a new account should be created. For example, the WGM 103 prompts a wagering game player to enter a username and a security credential before starting a wagering game. The wagering game player does not have an account, so the player clicks on a button to create the new account. The WGM 103 can determine an account identifier (i.e., a username) and a security credential for the new casino account. The account identifier and the security credential can be a string of alphanumeric characters. For example, the security credential can be password having a minimum of three characters. In some example embodiments, a wagering game player can abort the registration for the new casino account at any point in the process. Accordingly, the wagering game player can return to playing of the game at the wagering game machine. The wagering game player can create the casino account at a later time on the same or different wagering game machine. Alternatively, the wagering game player can create the casino account through an online account for the player (as further described below). In some example embodiments, if a player aborts the registration, the player can return to the registration process at a later time (e.g., during game play, after game play, through online account access, etc.). Also, if some of the registration had been completed, the WGM 103 can save the input from the player that has been completed. Accordingly, when the player returns to complete registration (either at a wagering game machine or through the online account), the registration can continue at the point where the player had stopped previously.

At stage 103.2, the WGM 103 transmits the account identifier and the security credential to the account server 101.

At stage 101.1, the account server 101 creates a casino player identity for the account based on the account identifier and the security credential. The casino player identity identifies the player in wagering game establishments and allows the player to log into WGMs. The WGM 103 uses the casino player identity to retrieve and store account information. For example, the WGM 103 can use progress information stored in the account to allow the player to resume a wagering game to a level reached in a previous wagering session. As another example, the WGM 103 can collect wagering statistics during the player's wagering sessions. The statistics can be transmitted to the account server 101 so that the statistics can be stored and presented to the player online through their online account (further described below). As another example, electronic trophies and other awards can be stored in the account so that the trophies and awards can later be viewed by the player's online account. The player may also be able to print copies of the trophies, post the trophies on social networking sites, etc. The casino player identity does not include any private information of the player to protect the player's private information in wagering game establishments.

At stage 101.2, the account server 101 stores the casino player identity. The account server 101 can store the casino player identity in an account database. The account server 101 can also return a message to the WGM 103 indicating that the account has been created successfully.

At stage 103.3, the WGM 103 displays an indication that the account should be claimed online. Alternatively or in addition, the WGM 103 can output a message (text, e-mail, telephone call) to a mobile device of the wagering game player about claiming the casino account through an online account. The telephone number of the mobile device can be provided by the wagering game player at the WGM 103. The WGM 103 can output data the notification in response to different activity occurring on the WGM 103. For example, the WGM 103 can output a message to the mobile device of the wagering game player after a casino account has been created, after the wagering game player logs in the casino account, after the wagering game player logs off the casino account, etc.

Although the account can be used in wagering game establishments to log into games, the account should be claimed online before the player can view any of the account information online. Claiming the account allows the user to provide private information in a setting that is more private than a casino floor. The private information can allow wagering game establishments to serve personalized content to the player (e.g., targeted advertisements and announcements). When the account is claimed, the casino player identity can be associated with an online player identity. The online player identity can be based on the player's e-mail address and can include other private information (e.g., the player's real name, date of birth, physical address, etc.). The private information can be used to enforce policies for participating in social aspects of the online wagering experience. For example, a discussion board administrator can warn the player by e-mail if the player's conduct in a discussion board is inappropriate.

At stage 105.1, the computer 105 attempts to access the account online. For example, the player enters the account identifier and the security credential to log into a website providing the online wagering experience. Note that stage 105.1 may not occur directly after stage 103.3.

At stage 101.3, the account server 101 determines that the account has not been claimed. The account server 101 can determine that the account has not been claimed based on account data in an account database. The account has not been claimed if an online player identity is not associated with account data provided by the casino account.

At stage 101.4, the account server 101 requests an e-mail address of the player that owns the account from the computer 105.

At stage 105.2, the computer 105 prompts the player to enter the e-mail address. For example, the computer 105 displays a dialog box that allows the player to type in the e-mail address.

At stage 105.3, the computer 105 transmits the e-mail address to the account server 101.

At stage 101.5, the account server 101 creates an online player identity for the account based on the e-mail address and the security credential associated with the casino player identity. The security credential is associated with both the online player identity and the casino player identity so that the player can log into the website and wagering games with the same security credential. Allowing use of the same security credential is more convenient for players because the players do not have to remember multiple security credentials. In other embodiments, the casino account and the online account have different security credentials of a same or different type. For example, the security credentials can be two different passwords. In another example, the security credential for the casino account could be a password, while the security credential for the online account could be a different or same password and facial recognition.

At stage 101.6, the account server 101 associates the online player identity with the casino player identity. The account server 101 can associate the online player identity with the casino player identity by storing the online player identity in the account data.

Once the online player identity has been associated with the casino player identity, the account server 101 can inform the player that the e-mail address should be used to log into the website instead of the account identifier of the casino player identity. If the player tries to log into the website with the account identifier of the casino player identity, the player can encounter a generic or personalized error message. In particular with regard to a personalized error message, an identification of the player can be determined based on the casino player identity. Accordingly, the personalized error message can include an identification of the person. In addition, the player cannot log into wagering games on WGMs using the e-mail address so that security of the player's e-mail address and other private information is maintained. The player's private information associated with the online player identity is not displayed at a WGM.

Although FIG. 1 describes some embodiments, the following sections describe many other features and embodiments.

Operating Environment

This section describes an example operating environment and presents structural aspects of some example embodiments. This section includes discussion about wagering game machine architectures, and wagering game networks.

Wagering Game Machine Architectures

Figure 2:
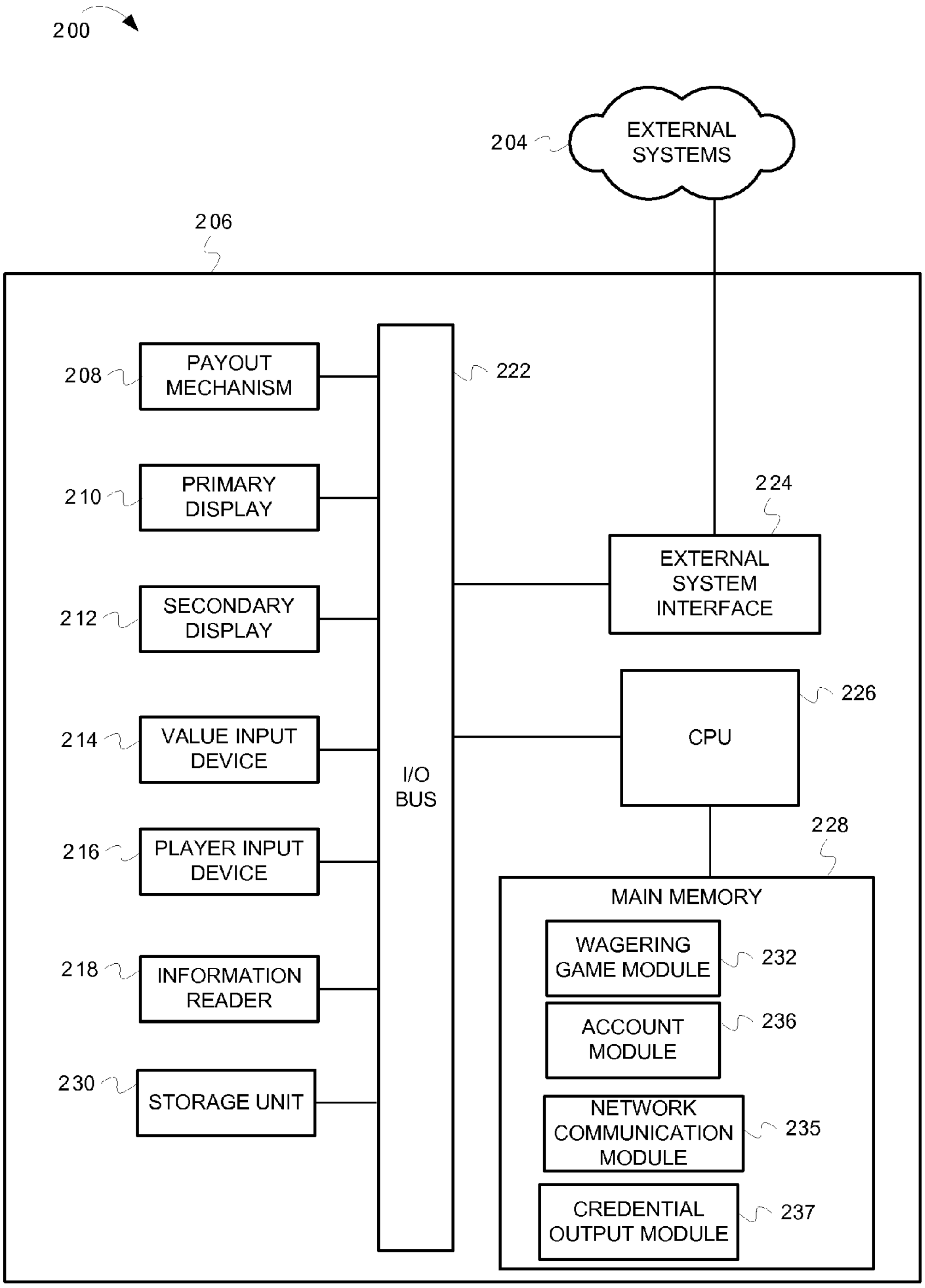
FIG. 2 is a block diagram illustrating a wagering game machine architecture, according to some example embodiments.

FIG. 2 is a block diagram illustrating a wagering game machine architecture, according to some example embodiments. As shown in FIG. 2, the wagering game machine architecture 200 includes a wagering game machine 206, which includes a central processing unit (CPU) 226 connected to main memory 228. The CPU 226 can include any suitable processor, such as an Intel® Pentium processor, Intel® Core 2 Duo processor, AMD Opteron™ processor, or UltraSPARC processor.

The main memory 228 includes a wagering game module 232, an account module 246, a network communication module 235 and a credential output module 237. In one embodiment, the wagering game module 232 can present wagering games, such as video poker, video black jack, video slots, video lottery, etc., in whole or part. The account module 236 is in communication with an account server to create casino identities for player accounts. The account module 236 can retrieve account information associated with casino identities to restore wagering game sessions. The account module 236 can store information (e.g., wagering statistics, electronic awards, etc.) in the account. The network communication module 235 can communicate the casino player identities, wagering game activity, etc. to the account server over a network.

The credential output module 237 can output the security credential and messaging regarding the security credential to a mobile device. This data output can be sent as a text, an e-mail, a telephone call, etc. This output can be response to a request by the wagering game player. For example, the wagering game player can enter, at the wagering game device, their telephone number associated with their mobile device and a request for a particular type of data output to the mobile device.

The credential output module 237 can also output data to a mobile device in response to different activity occurring on the wagering game machine. For example, the credential output module 237 can output a message to the mobile device of the wagering game player after a casino account has been created, after the wagering game player logs in the casino account, after the wagering game player logs off the casino account, etc. The message could indicate that the casino account can be claimed by an online account that is accessible at a website (which is further described below).

The CPU 226 is also connected to an input/output (I/O) bus 222, which can include any suitable bus technologies, such as an AGTL+ frontside bus and a PCI backside bus. The I/O bus 222 is connected to a payout mechanism 208, primary display 210, secondary display 212, value input device 214, player input device 216, information reader 218, and storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided.

Any component of the architecture 200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 2 describes an example wagering game machine architecture, this section continues with a discussion wagering game networks.

Wagering Game Networks

Figure 3:
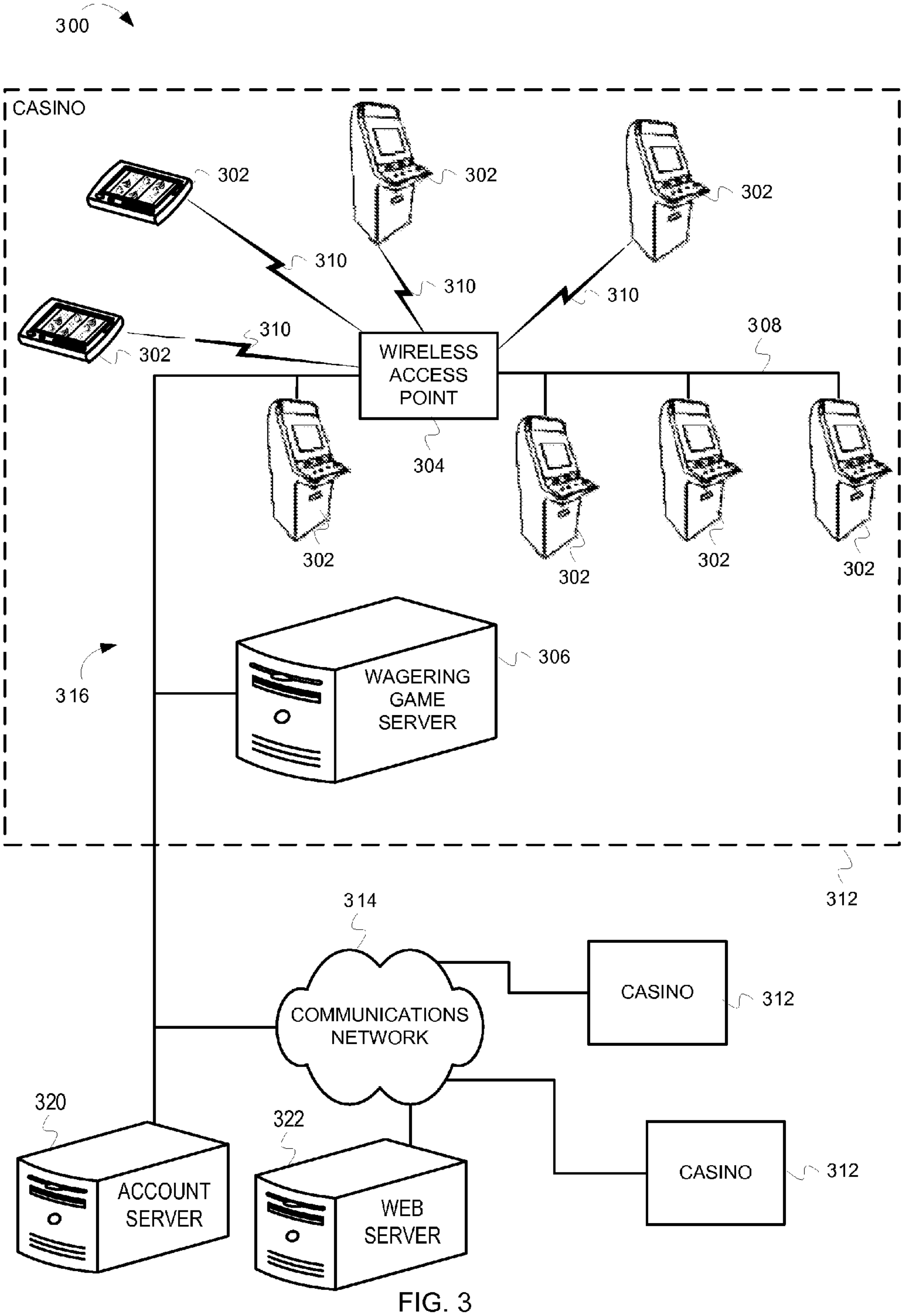
FIG. 3 is a block diagram illustrating a wagering game network, according to some example embodiments.

FIG. 3 is a block diagram illustrating a wagering game network, according to some example embodiments. As shown in FIG. 3, the wagering game network 300 includes a plurality of casinos 312, an account server 320, and a web server 322 connected to a communications network 314.

Each casino 312 includes a local area network 316, which includes an access point 304, a wagering game server 306, and WGMs 302. The access point 3304 provides wireless communication links 310 and wired communication links 308. The wired and wireless communication links can employ any suitable connection technology, such as Bluetooth, 802.11, Ethernet, public switched telephone networks, SONET, etc. In some embodiments, the wagering game server 306 can serve wagering games and distribute content to devices located in other casinos 312 or at other locations on the communications network 314.

The WGMs 302 described herein can take any suitable form, such as floor standing models, handheld mobile units, bartop models, workstation-type console models, etc. Further, the WGMs 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In some embodiments, WGMs 302 and wagering game servers 306 work together such that a WGM 302 can be operated as a thin, thick, or intermediate client. For example, one or more elements of game play may be controlled by the WGM 302 (client) or the wagering game server 306 (server). Game play elements can include executable game code, lookup tables, configuration files, game outcome, audio or visual representations of the game, game assets or the like. In a thin-client example, the wagering game server 306 can perform functions such as determining game outcome or managing assets, while the WGM 302 can present a graphical representation of such outcome or asset modification to the user (e.g., player). In a thick-client example, the WGMs 302 can determine game outcomes and communicate the outcomes to the wagering game server 306 for recording or managing a player's account.

In some embodiments, either the WGMs 302 (client) or the wagering game server 306 can provide functionality that is not directly related to game play. For example, account transactions and account rules may be managed centrally (e.g., by the wagering game server 306) or locally (e.g., by the WGM 302). Other functionality not directly related to game play may include power management, presentation of advertising, software or firmware updates, system quality or security checks, etc.

The WGMs 302 communicate with the account server 320 to create casino identities for player accounts. The account server 320 serves account information to the WGMs 302 based on casino identities specified by the WGMs 302. The web server 322 serves webpages to web clients (not shown) to provide extended wagering experiences. The web server 322 also facilitates claiming of player accounts. If an account is not associated with an online player identity ("claimed"), the web server 322 creates an online player identity and associates the online player identity with the casino player identity. The web server 322 leverages the account server 320 to serve account information and personalized extended wagering experiences to the web clients. Although FIG. 3 depicts the account server 320 and the web server 322 as separate entities, the account server 320 and the web server 322 can be combined into a single entity.

Any of the wagering game network components (e.g., the WGMs 302) can include hardware and machine-readable media including instructions for performing the operations described herein.

Example Operations

This section describes operations associated with some example embodiments. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 4:
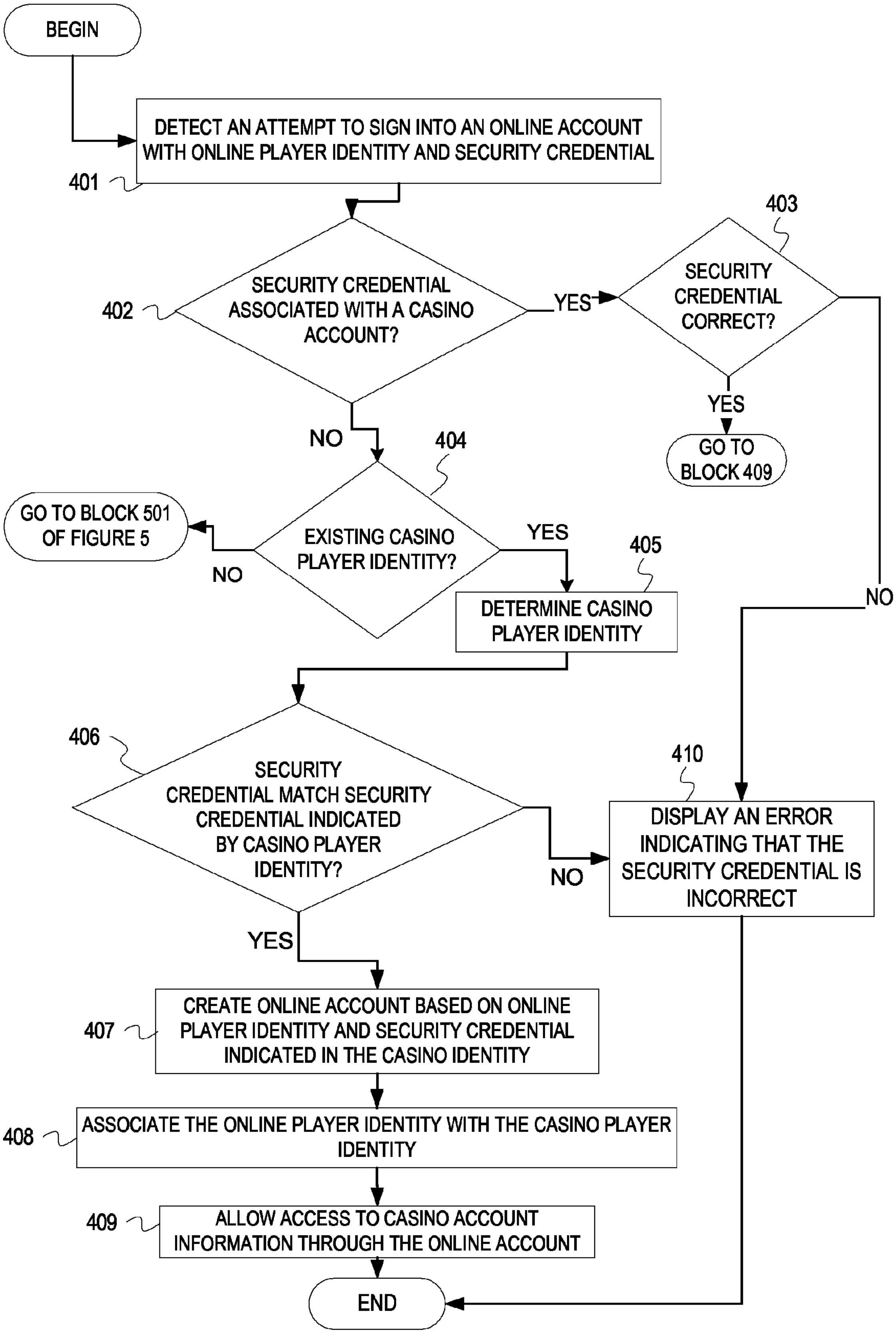
FIG. 4 is a flowchart of operations for online access and claiming of a casino account, according to some example embodiments.
Figure 5:
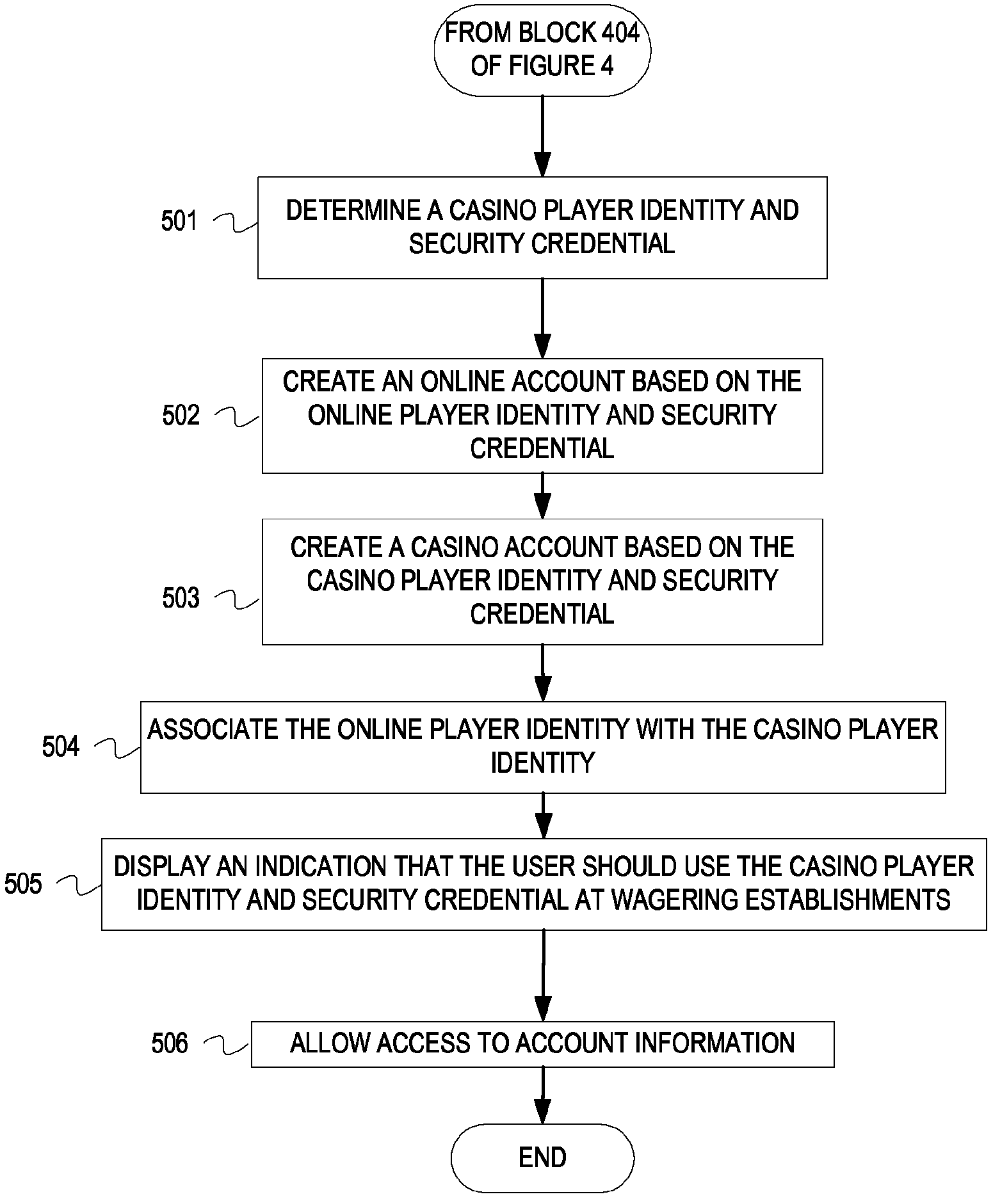
FIG. 5 is a flowchart of operations for online access by a wagering game player not having a casino player identity, according to some example embodiments.
Figure 6:
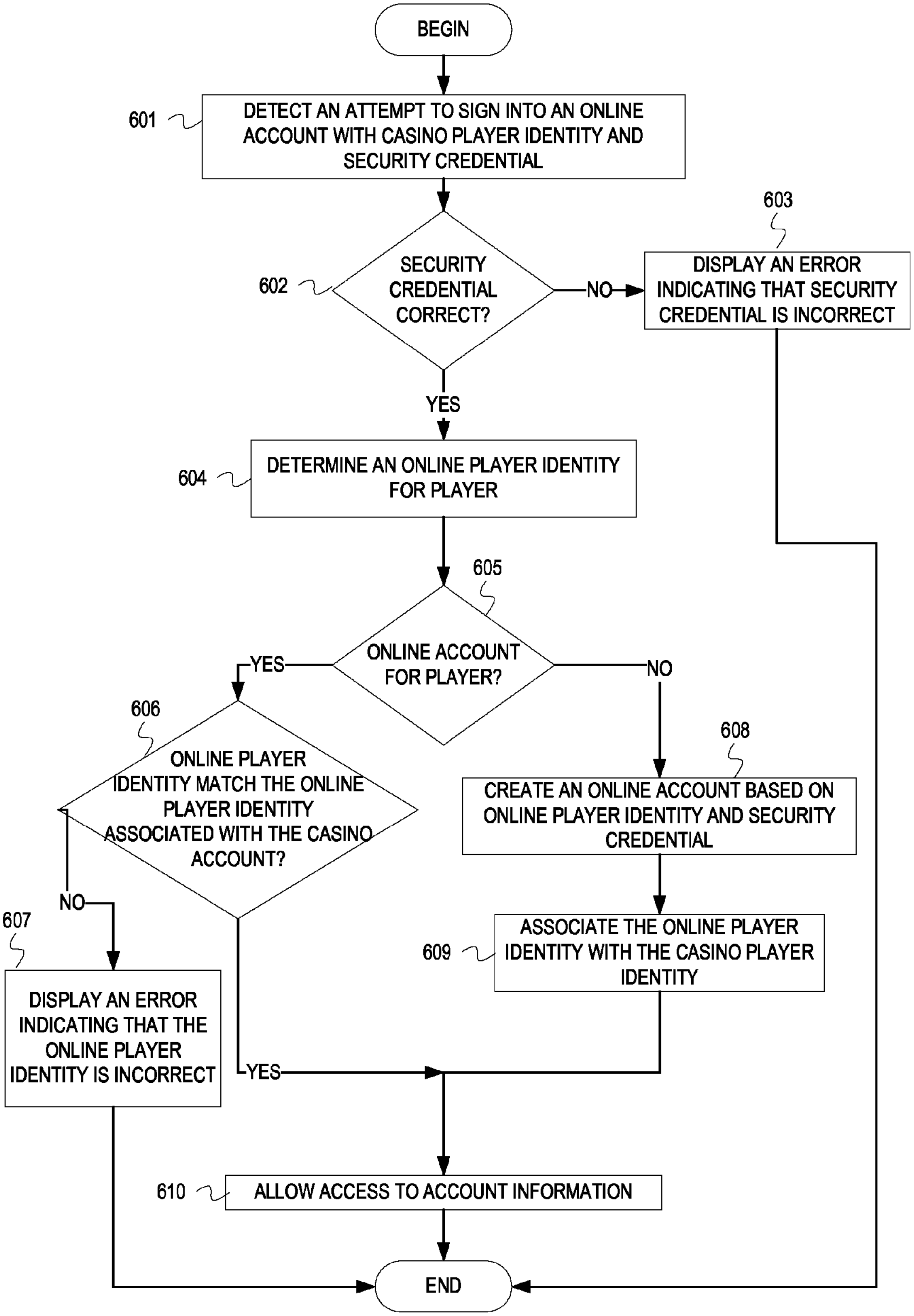
FIG. 6 is a flowchart of operations for online access by a wagering game player in response to attempted online access using a casino player identity, according to some example embodiments.

The section will discuss FIGS. 4-6. The discussion of FIGS. 4-6 will describe operations for facilitating claiming of player accounts.

Online identities can associate a wagering game player's private information with anonymous casino identities used in wagering game establishments. The separation of the casino player identity and online player identity allows private information to be kept confidential in unsecure environments of wagering game establishments while allowing for a richly personalized experience outside of the wagering game establishment. In some other embodiments, a wagering game player can log into their online account through a wagering game machine. Accordingly, at least some of the data accessible through the online account may be viewable at the wagering game machine. In some example embodiments, the access to the online account is limited. For example, a wagering game player can view some or all of the data, but cannot update the data. In some other example embodiments, the access to the online account through the wagering game machine is not limited. In particular, in some example embodiments, the wagering game player can update some or all of the data at the wagering game machine. For example, the wagering game player can update their name or email address but not their date of birth. In an alternative example, there are no limits on what information can be updated at the wagering game machine.

FIG. 4 is a flowchart of operations for online access and claiming of a casino account, according to some example embodiments. Operations begin at block 401, where an account server detects an attempt to sign into an online account with an online player identity (e.g., an e-mail address) and a security credential. For example, the account server determines the online player identity and the security credential from text boxes in a sign-on area of a webpage in response to detecting a click on a sign-in button. Operations continue at block 402.

At block 402, the account server determines if the online player identity is associated with a claimed account. The account server can search an account database for the online player identity to determine if the online player identity is indicated in an online player identity of an account. If the online player identity is associated with a claimed account, operations continue at block 403. If the online player identity is not associated with a claimed account, operations continue at block 404.

At block 403, the account server determines if the security credential is correct. Determining if the security credential is correct can comprise comparing the security credential with a security credential identified by an online player identity of the claimed account. If the security credential is correct, operations continue at block 409. If the security credential is not correct, operations continue at block 410.

At block 404, the account server determines if a user has an existing casino player identity. The user may have previously created a casino player identity during a visit to a wagering game establishment. If the user has a casino player identity, operations continue at block 405. If the user does not have a casino player identity, operations continue at block 501 of FIG. 5 (described below).

At block 405, the account server determines the casino player identity. For example, the account server prompts the user to enter a username and a security credential of the casino player identity. The security credential may be pre-populated based on the security credential supplied in the attempt to sign in (block 401). Operations continue at block 406.

At block 406, the account server determines if the security credential matches a security credential indicated in the casino player identity. Determining if the security credential matches comprises searching an account database for the casino player identity based on the username and comparing the security credential indicated in the casino player identity with the supplied security credential. In some situations, the communication link between the account server and a web server used for providing online access can be broken or unavailable. Accordingly, the account server stores player information into local media therein. The wagering game player can continue to wagering game activity at the wagering game machine. The data regarding this activity can then be transferred to the web server for the online account after the communication link is restored. If the security credential matches, operations continue at block 407. If the security credential does not match, operations continue at block 410.

At block 407, the account server creates an online player identity based on the online player identity and the security credential indicated in the casino player identity. The online player identity allows the user to log into the website providing the extended wagering experience. Operations continue at block 408.

At block 408, the account server associates the online player identity with the casino player identity. Associating the online player identity can comprise storing the online player identity in a database record of the casino account. Operations continue at block 409.

At block 409, the account server allows access to the casino account. Allowing access to the casino account can comprise displaying account data (e.g., information identifying the user, wagering statistics, electronic rewards, etc.) in a webpage. The account server can also allow the user to access exclusive content. For example, the account server allows the user access to discussion boards. As another example, the account server allows the user to access non-monetary wagering games. The operations are complete.

At block 410, the security credential was incorrect, so the account server displays an error indicating that that the security credential is incorrect and the operations are complete.

FIG. 5 is a flowchart of operations for online access by a wagering game player not having a casino player identity, according to some example embodiments. At block 501, the online player identity is not associated with a casino account and the wagering game player does not have a casino player identity, because a casino account has not been created for the player (see block 404 of FIG. 4). The account server determines a casino player identity and a security credential that can be provided by wagering game player. The casino player identity and security credential can be credentials for the casino account, so that the wagering game player can log into wagering games in wagering game establishments. Operations continue at block 502.

At block 502, the account server creates an online account based on the online player identity and the security credential. The online player identity was supplied in block 401 of FIG. 1. The e-mail address and security credential can represent log in credentials for the website providing the extended wagering experience, so that the user can log into the website. Operations continue at block 503.

At block 503, the account server creates a casino player identity based on the account identifier and the security credential. When a new account is created in a wagering game establishment, a casino player identity can be created for the account, but no online player identity is created at that time. The casino player identity can be used to access the account in wagering game establishments without the account ever being claimed online. However, an online player identity cannot be used on the website unless there is a corresponding casino player identity. So, when an account is created online, both an online player identity and a casino player identity can be created for the account. Operations continue at block 504.

At block 504, the account server associates the online player identity with the casino player identity. Operations continue at bock 505.

At block 505, the account server displays an indication that the wagering game player should use the casino player identity and the security credential at wagering game establishments. The account server can also indicate that the online player identity and the security credential should be used to log in online. Operations continue at block 506.

At block 506, the account server allows access to the account information. For example, the account server displays a profile questionnaire that allows the user to enter personal information. Operations are complete.

A wagering game player should access the extended wagering experience with the online player identity and security credential. In particular, the wagering game player can claim their casino player identity through an online account, thereby associating the casino player identity with the online player identity. Signing into a website providing the extended wagering experience with identity that is separate from the casino player identity provides security for private information that may be store in the account if the casino player identity is compromised in a wagering game establishment.

When a wagering game player first visits the website, the player may be confused and may try to log into the website with the casino player identity. FIG. 6 is a flowchart of operations for online access by a wagering game player in response to attempted online access using a casino player identity, according to some example embodiments. Operations begin at block 601, where an account server detects an attempt to sign into an account with an account identifier and a security credential. For example, the account server determines the account identifier and the security credential from text boxes in a sign-on area of a webpage in response to detecting a click on a sign-in button. Operations continue at block 602.

At block 602, the account server determines if the security credential is correct. Determining if the security credential is correct can comprise locating an account in a database with a casino player identity corresponding to the account identifier, and comparing the security credential with a security credential indicated by the casino player identity. If the security credential is not correct, operations continue at block 603. If the security credential is correct, operations continue at block 604.

At block 603, the account server displays an error indicating that the security credential is incorrect and operations are complete.

At block 604, the security credential was correct, so the account server determines an online player identity of the wagering game player. For example, the account server prompts the user to enter the user's e-mail address. Operations continue at block 605.

At block 605, the account server determines if there is an online account for the wagering game player. Determining if there is an online account for the player comprises determining if an online player identity is associated with the casino account. If there is an online player identity associated with the casino account, operations continue at block 606. If there is no online player identity associated with the casino account, operations continue at block 608.

At block 606, the account server determines if the online player identity matches the online player identity associated with the casino account. If the online player identity does not match, operations continue at block 607. If the online player identity does not match, operations continue at block 610.

At block 607, the account server displays an error indicating that the online player identity is incorrect and operations are complete.

At block 608, there is no online player identity for the account, so the account server creates an online account based on the online player identity and security credential. Operations continue at block 609.

At block 609, the account server associates the online player identity with the casino player identity. For example, the account server stores the online player identity in account data corresponding to the casino player identity.

At block 610, the account server allows access to the account information associated with the casino activity of the casino account through the online account. For example, the user's wagering statistics are displayed on a webpage. The user may be able to select time ranges for viewing the statistics and/or which statistical values should be shown. Operations are complete.

Example embodiments are described such that the online player identity and the casino player identity are different. However, in some other example embodiments, the online player identity and the casino player identity are the same. Accordingly, the identities and the passwords for the online account and the casino account can be the same.

Example Wagering Game Machines

Figure 7:
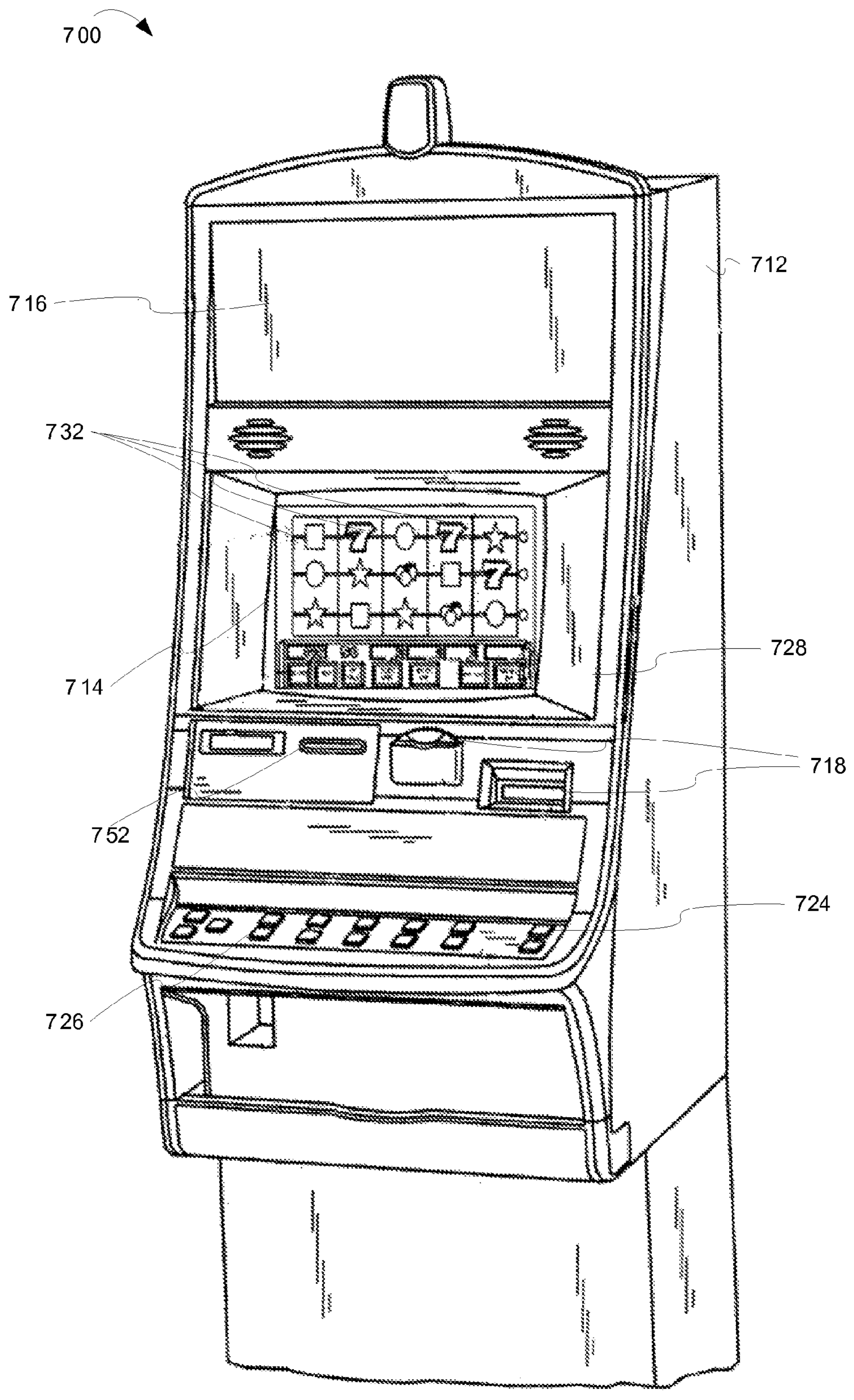
FIG. 7 is a perspective view of a wagering game machine, according to some example embodiments.

FIG. 7 is a perspective view of a wagering game machine, according to some example embodiments. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716. A user can use the buttons panel 726 and/or touch screen 728 for inputting an account identifier and a security credential for logging into wagering games on the WGM 700.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright"

version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computerized method for associating a casino account and an online account of a wagering game player, the computerized method comprising:

detecting, by an electronic processing unit of an account server, that the casino account was electronically accessed using a casino identity for the wagering game player for play of a wagering game on a wagering game machine, the wagering game machine configured to detect, via at least one or more electronic input devices, that a physical item associated with a monetary value establishes a credit balance, and wherein the access is via a network interface of the account server that communicably couples the account server to the wagering game machine;

after the detecting that the casino account was electronically accessed using the casino identity, creating, in a machine-readable storage medium accessible to the account server, the online account that is associated with the wagering game player, wherein the online account is accessed using an online identity, wherein the online account includes information stored on the machine-readable storage medium, the information including data associated with the play of the wagering game;

receiving, via at least one of the one or more electronic input devices, a cashout input that initiates a payout from the credit balance;

after receiving the cashout input, receiving, at a website, first electronic input for an access request to access the online account stored on the machine-readable storage medium for the wagering game player;

receiving, at the website, second electronic input for a claim request to claim the casino account for the online account of the wagering game player;

in response to receiving the second electronic input for the claim request, validating, by the electronic processing unit of the account server, a security credential associated with the casino account, the validation utilizing credential information stored on the machine-readable storage medium;

after the validating, determining, by the electronic processing unit of the account server utilizing the information stored on the machine-readable storage medium, that the casino account has not been claimed by the online account or other online accounts; and after the determining that the casino account has not been claimed, claiming the casino account for the online account, wherein the online account is accessible using the online identity and wherein the online account is inaccessible using the casino identity, wherein claiming the casino account for the online account includes associating the casino account with the online account using a data record stored on the machine-readable storage medium.

2. The computerized method of claim 1, wherein the casino account is accessible using the casino identity and wherein the casino account is inaccessible using the online identity.

3. The computerized method of claim 1, wherein a security credential associated with the online account is the same as the security credential associated with the casino account.

4. The computerized method of claim 1, wherein the online identity comprises an e-mail address of the wagering game player.

5. The method of claim 1, further comprising:

in response to determining that the online identity has been used at a wagering game machine to access the online account, limiting access to the online account.

6. The method of claim 5, wherein limiting access to the online account comprises providing read-only access to the online account.

7. One or more machine-readable storage media including instructions which, when executed by one or more processors, cause the one or more processors to perform operations comprising:

detecting, by the one or more processors, that a casino account associated with a wagering game player was electronically accessed using a casino identity for the wagering game player for play of a wagering game on a wagering game machine, the wagering game machine configured to detect, via at least one or more electronic input devices, that a physical item associated with a monetary value establishes a credit balance, and wherein the access is via a network interface of an account server that communicably couples the account server to the wagering game machine;

after the detecting that the casino account was electronically accessed using the casino identity, creating, in the one or more machine-readable storage media, an online account that is associated with the wagering game player, wherein the online account is accessed using an online identity, wherein the online account includes information stored on the one or more machine-readable storage media, the information including data associated with the play of the wagering game;

receiving, via at least one of the one or more electronic input devices, a cashout input that initiates a payout from the credit balance;

after receiving the cashout input, receiving, at a website, first electronic input for an access request to access the online account for the wagering game player;

receiving, at the website, second electronic input for a claim request to claim the casino account for the online account of the wagering game player;

in response to receiving the second electronic input for the claim request, validating, by the one or more processors, a security credential associated with the casino account, the validation utilizing credential information stored on the one or more machine-readable storage media;

after the validating, determining, by the one or more processors utilizing the information stored on the one or more machine-readable storage media, that the casino account has not been claimed by the online account or other online accounts; and after the determining that the casino account has not been claimed, claiming the casino account for the online account, wherein the online account is accessible using the online identity, wherein the online account is inaccessible using the casino identity, and wherein claiming the casino account for the online account includes associating the casino account with the online account using a data record stored on the one or more machine-readable storage media.

8. The one or more machine-readable storage media of claim 7, wherein the casino account is accessible using the casino identity and wherein the casino account is inaccessible using the online identity.

9. The one or more machine-readable storage media of claim 7, wherein the online identity comprises an e-mail address of the wagering game player.

10. The one or more machine-readable storage media of claim 7, wherein a security credential associated with the online account is the same as the security credential associated with the casino account.

11. The one or more machine-readable storage media of claim 10, wherein the security credential associated with the casino account comprises at least one of a password, a biometric credential of the wagering game player and a key fob.

12. The one or more machine-readable storage media of claim 7, wherein the casino account comprises at least one of a persistent state game account and an account-based wagering account.

13. The one or more machine-readable storage media of claim 7, wherein the operations further comprise:

in response to determining that the online identity has been used at a wagering game machine to access the online account, limiting access to the online account.

14. The one or more machine-readable storage media of claim 13, wherein limiting access to the online account comprises allowing updates to a first subset of data for the online account and disallowing updates to a second subset of data for the online account.

15. The one or more machine-readable storage media of claim 7, wherein the operations further comprise:

in response to determining that the online identity has been used at a wagering game machine to access the online account, limiting access to the online account.

16. An apparatus comprising:

machine-readable storage media configured to store instructions; and a processor, in response to execution of the instructions, configured to:

detect that a casino account was electronically accessed using a casino identity for a wagering game player for play of a wagering game on a wagering game machine, the wagering game machine configured to detect, via at least one or more electronic input devices, that a physical item associated with a monetary value establishes a credit balance, and wherein the access is via a network interface of an account server that communicably couples the account server to the wagering game machine;

after the detection that the casino account was electronically accessed using the casino identity, create, in the machine-readable storage media, an online account that is associated with the wagering game player, wherein the online account is accessed using an online identity, wherein the online account includes information stored on the machine-readable storage media, the information including data associated with the play of the wagering game;

receive, via at least one of the one or more electronic input devices, a cashout input that initiates a payout from the credit balance;

after reception of the cashout input, receive, at a website, first electronic input for an access request to access the online account stored on the machine-readable storage media for the wagering game player;

receive, at the website, second electronic input for a claim request to claim the casino account for the online account of the wagering game player;

in response to receipt of the second electronic input for the claim request, validate, by the processor, a security credential associated with the casino account, the validation utilizing credential information stored on the machine-readable storage media;

after the validate, determine, by the processor utilizing the information stored on the machine-readable storage media, that the casino account has not been claimed by the online account or other online accounts; and after the determine that the casino account has not been claimed, claim the casino account for the online account, wherein the online account is accessible using the online identity and wherein the online account is inaccessible using the casino identity.

17. The apparatus of claim 16, wherein the casino account is accessible using the casino identity and wherein the casino account is inaccessible using the online identity.

18. The apparatus of claim 16, wherein a security credential associated with the online account is the same as the security credential associated with the casino account.

19. The apparatus of claim 16, wherein the online identity comprises an e-mail address of the wagering game player.

20. The apparatus of claim 16, wherein the processor, in response to execution of the instructions, is further configured to:

in response to a determination that the online identity has been used at a wagering game machine to access the online account, limit access to the online account.

* * * * *